United States Patent [19]

Schotthoefer

[11] Patent Number: 5,028,288
[45] Date of Patent: Jul. 2, 1991

[54] A METHOD OF MANUFACTURING A DOOR EDGE GUARD

[75] Inventor: Gerald R. Schotthoefer, Dallas, Tex.

[73] Assignee: Adell Corporation, Sunnyvale, Tex.

[21] Appl. No.: 398,951

[22] Filed: Aug. 28, 1989

[51] Int. Cl.⁵ .............................................. B29C 47/02
[52] U.S. Cl. ..................................... 156/226; 156/227;
156/244.11; 156/244.12; 156/244.24;
264/177.1; 264/177.2; 264/271.1; 29/527.4
[58] Field of Search ....................... 156/244.11, 244.12,
156/244.18, 244.24, 227, 226; 29/527.4;
264/271.1, 177.1, 177.2

[56] References Cited

U.S. PATENT DOCUMENTS

| | | | |
|---|---|---|---|
| 4,411,941 | 10/1983 | Azzola | 264/177.1 |
| 4,697,327 | 10/1987 | Adell | 29/527.4 |
| 4,787,175 | 11/1988 | Adell | 49/462 |
| 4,849,045 | 7/1989 | Schmidt | 264/177.1 |

FOREIGN PATENT DOCUMENTS 0031937  2/1985  Japan ................ 264/177.1

Primary Examiner—Caleb Weston
Attorney, Agent, or Firm—Timmons & Kelly

[57] ABSTRACT

Disclosed is an insulated metal door edge guard having a stainless steel body, a PVC cover, and a sheet of colored PVF. The PVC cover is coextruded completely around the metal body in strip form. Then, before the heat of the coextrusion step is lost, the PVF sheet is laminated onto one surface of the PVC cover. The combination is then roll formed into a door edge guard having a base and two legs. The ends of the legs are folded inward to form two beads. The PVC cover has two regions of decreased thickness on the interior of the beads to facilitate the roll forming of the beads.

4 Claims, 1 Drawing Sheet

A METHOD OF MANUFACTURING A DOOR EDGE GUARD

BACKGROUND OF THE INVENTION

1. Field of the Invention

This invention relates in general to door edge guards mounted on the trailing edges of automobile doors and to methods of manufacturing such door edge guards. In particular, the invention relates to insulated metal door edge guards having a color to match the color of the automobile door to which the door edge guard is to be attached.

2. Description of the Prior Art

Door edge guards are mounted on the trailing edges of automobile doors to protect the edges of the doors and to protect objects that are struck by the door edge. For example, in a crowded parking lot the door edge may strike the side of an adjacent automobile. Without door edge guards, the door edges may be chipped and subsequently rust.

Both metal and non-metal door edge guards are manufactured. Non-metal door edge guards are made of various plastics, such as polyvinylchloride (PVC). Metal door edge guards are generally made of stainless steel or aluminum. If the metal of the guard is different from the metal of the door, usually carbon steel, then the two metals must be insulated to prevent electrochemical action between the two metals from causing galvanic corrosion. Insulating materials are generally plastics, such as PVC.

In many prior art door edge guards aluminum is used because the galvanic corrosion does not produce red rust. However, stainless steel has more resilience than aluminum, so stainless steel is preferred over aluminum, if the insulation is adequate.

U.S. Pat. No. 4,697,327, issued Oct. 6, 1987, to Adell, shows an insulated metal door edge guard. During manufacucturing, the plastic insulating material is coextruded onto a flat metal strip. The strip is then painted and roll formed to form a door edge guard.

The heat of extrusion may be used to join two materials. For example, U.S. Pat. No. 4,787,175, issued Nov. 29, 1988, to Adell, shows a non-metal door edge guard. A flat, plastic strip is extruded and the heat of extrusion is used to laminate a roll of mylar or encapsulated foil onto the plastic strip. The combination is then roll formed into a door edge guard. An adhesive may be used to improve the joining of the mylar or foil with the plastic.

In the past many door edge guards have been black or silver. More recently, though, automobile manufacturers have preferred for the door edge guards to be the same color as the automobile door. Many different methods have been used to add color to door edge guards.

As mentioned earlier, U.S. Pat. No. 4,697,327 discloses painting the plastic cover prior to roll forming. U.S. Pat. No. 4,787,175, also mentioned earlier, discloses laminating a layer of mylar onto the plastic strip.

Coextrusion has also been tried. However, when the colored material is coextruded with the plastic, the color flakes in the colored material tend to align themselves, giving the material different colors when observed from different angles.

Another method that has been attempted involves laminating colored material, such as polyvinylfluoride (PVF) onto sheets of plastic. The plastic is then cut into thin strips and roll formed.

SUMMARY OF THE INVENTION

The door edge guard of the invention includes a metal body having a curved base adapted to fit over the trailing edge of a door. Legs extend from the base to fit against the sides of the door. An insulating cover is coextruded onto and completely surrounds the metal body to prevent contact between the metal body and metal in the door. A sheet of colored material is laminated onto the outer surface of the cover to provide a selected color to the door edge guard.

The ends of the legs of the metal body may be folded inward to form beads. The insulating cover has a uniform thickness, except on the interior portion of the two beads, where the insulating cover has a decreased thickness. The decreased thickness of the insulating cover facilitates the folding of the legs to form the beads.

The method of the invention is a method of manufacturing a door edge guard for protecting the trailing edge of an automobile door. The first step is coextruding an insulated cover of polyvinylchloride (PVC) completely around a continuous strip of stainless steel. Then, a strip of polyvinylfluoride (PVF) is laminated onto one surface of the insulating cover before the cover has lost the heat of the coextrusion step. Next, the combination is roll formed into a shape having a curved base and legs to fit onto the edge of the door. The colored PVF is on the exterior side of the base and legs. Finally, the strip is cut to a selected length.

In some embodiments, the roll forming step includes folding the ends of the legs inward to form beads. The coextruding step may include forming two regions of decreased thickness in the insulating cover to facilitate the roll forming of the beads.

In some embodiments, the door edge guard of the invention has legs that are bowed outward to limit the contact between the legs and the door. The roll forming step of the method of the invention may include roll forming the combination into such a shape.

DESCRIPTION OF THE PREFERRED EMBODIMENT

Figure 1:
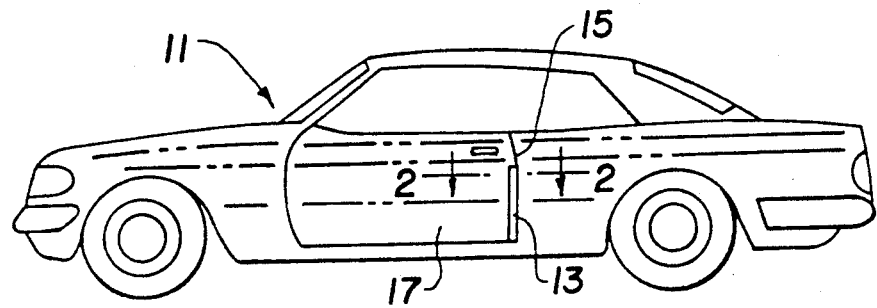
FIG. 1 is a side view of an automobile including the preferred embodiment of the invention, manufactured in accordance with the method of the invention.

FIG. 1 shows a typical automobile 11. The automobile 11 has a door edge guard 13 on the trailing edge 15 of the door 17. The door edge guard 13 is shown in more detail in FIG. 2.

Figure 2:
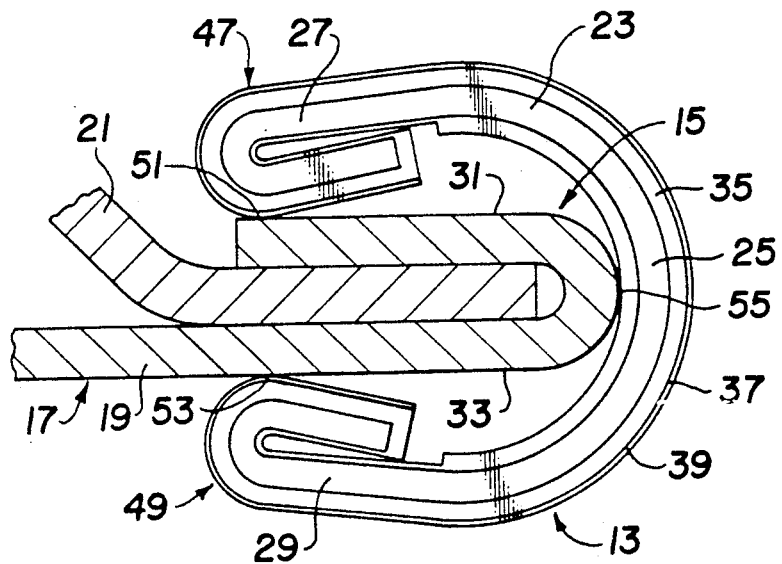
FIG. 2 is a sectional view, as seen along lines 2—2 in FIG. 1.

As shown in FIG. 2, the outer skin 19 of the door 17 wraps around the inner support panel 21 of the door 17 at the trailing edge 15. The door edge guard 13 fits around the trailing edge 15 of the door 17 to protect the door 17.

The door edge guard 13 is made of three materials. The innermost material is a stainless steel body 23, having a curved base 25 and a pair of legs 27 and 29. The base 25 is adapted to fit over the trailing edge 15 of the door 17. The legs 27 and 29 extend from the base 25 to fit against the sides 31 and 33 of the trailing edge 15 of the door 17.

The metal body 23 is completely surrounded by an insulating cover 35. The insulating cover 35 is made of plastic, preferably polyvinylchloride (PVC). The plastic insulating cover 35 provides an electrical insulator between the stainless steel in the body 23 of the door edge guard 13 and the carbon steel in the door 17.

A sheet of colored material 37 is laminated onto the outer surface 39 of the insulating cover 35. The colored material 37 is preferably polyvinylfluoride (PVF). The color of the PVF 37 can be matched to the color of the door 17 to provide attrative protection for the trailing edge 15.

Figure 3:
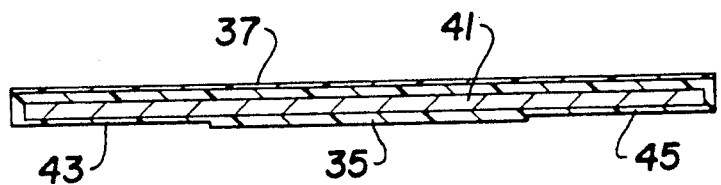
FIG. 3 is a sectional view of the preferred embodiment of the invention prior to the roll forming step.

The method of the invention involves first coextruding the PVC insulating cover 35 completely around a continuous stainless steel strip 41, as shown in FIG. 3. At this point, the metal strip 41 is approximately 0.710 inch wide and 0.015 inch thick. The insulating cover 35 is approximately 0.010 inch thick, except for two regions 43 and 45 of decreased thickness.

The second step of the method of the invention takes place immediately after the first, before the heat of the coextrusion step has been lost. The layer of colored material 39 is laminated onto one surface of the insulating cover 35. If some cases, an adhesive may be placed between the insulating cover 35 and the colored material 39. The colored material 39 is 0.730 inch wide and 0.002 inch thick.

The combination of the metal strip 41, the insulating cover 35, and the colored material 39 is then roll formed into the shape shown in FIG. 2. The metal strip 41 is formed into the base 25 and the two legs 27 and 29 of the body 23. The ends of the legs 27 and 29 are folded inward towards one another to form beads 47 and 49. The regions 43 and 45 of reduced thickness in the insulating cover 35 become the interior portions of the beads 47 and 49 and facilitate the forming of the beads 47 and 49.

The legs 27 and 29 of the body 23 are bowed outward, as seen in FIG. 2, to limit the contact between the legs 27 and 29 and the door 17. Therefore, the door edge guard 13 contacts the door 17 at three places: at the inner surface 51 and 53 of each bead 47 and 49, and in the middle 55 of the base 25.

The next step is cutting the formed combination to a desired length. It may also be necessary to bend the door edge guard 13 to fit the trailing edge 15. The door edge guard 13 is installed by pushing the door edge guard 13 over the trailing edge 15 of the door 17.

The apparatus and method of the invention have several advantages over the prior art. The method of the invention uses the heat of the coextrusion step to laminate the colored material 39 to the insulating cover 35, so there is a savings of energy costs. The PVF material can be closely matched to the colors used on the automobile doors 17. Further, since the metal body 23 is completely insulated from the carbon steel in the door 17, the body 23 can be made of stainless steel, which is more resilient than aluminum.

The invention has been shown in only one of its embodiments. It should be apparent to those skilled in the art that the invention is not so limited, but is susceptible to various changes and modifications without departing from the spirit and scope of the invention.

I claim:

1. A method of manufacturing a door edge guard for protecting the trailing edge of a door, comprising the steps of:

coextruding an insulating cover completely around a continuous metal strip, forming two regions of decreased thickness in the insulating cover;

laminating a strip of colored material onto one surface of the insulating cover before the cover has lost the heat of the coextrusion step;

roll forming the combination of the metal strip, the insulating cover, and the colored material into a shape having a curved base adapted to fit over the edge and legs extending from the base to fit against the sides of the door against the edge, and folding the legs inward toward one another to form beads, wherein the two regions of decreased thickness in the insulating cover become interior portions of the beads and facilitate the forming of the beads and wherein the colored material is on the exterior side of the base and the legs; and cutting the formed combination to a desired length.

2. The method as recited in claim 1, wherein the roll forming step includes roll forming the combination of the metal strip, the insulating cover, and the colored material into a shape in which the legs are bowed outward to limit contact between the legs and the door.

3. A method of manufacturing a door edge guard for protecting the trailing edge of a door, comprising the steps of:

coextruding an insulating cover of polyvinylchloride completely around a continuous strip of stainless steel, forming two regions of decreased thickness in the insulating cover;

laminating a strip of colored polyvinylfluoride onto one surface of the insulating cover before the cover has lost the heat of the coextrusion step;

roll forming the combination of the stainless steel strip, the insulating cover, and the colored polyvinylfluoride into a shape having a curved base adapted to fit over the edge and legs extending from the base to fit against the sides of the door adjacent the edge, and folding the legs inward toward one another to form beads, wherein the two regions of decreased thickness in the insulating cover become interior portions of the beads and facilitate the forming of the beads and wherein the colored polyvinylfluoride is on the exterior side of the base and the legs; and cutting the formed combination to a desired length.

4. The method as recited in claim 3, wherein the roll forming step includes roll forming the combination of the stainless steel strip, the insulating cover, and the polyvinylfluoride into a shape in which the legs are bowed outward to limit contact between the legs and the door.

* * * * *